US006951268B2

(12) United States Patent
Guettler

(10) Patent No.: US 6,951,268 B2
(45) Date of Patent: Oct. 4, 2005

(54) SYSTEM FOR TRANSMITTING ENERGY AND/OR DATA BETWEEN A VEHICLE BODY AND A REMOVABLE PART

(75) Inventor: Hans Guettler, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 382 days.

(21) Appl. No.: 10/071,146

(22) Filed: Feb. 6, 2002

(65) Prior Publication Data

US 2002/0121417 A1 Sep. 5, 2002

(30) Foreign Application Priority Data

Feb. 10, 2001 (DE) ........................................ 101 06 173

(51) Int. Cl.[7] ................................................ B60L 9/00

(52) U.S. Cl. ............................ 191/10; 320/2; 336/196; 49/370

(58) Field of Search ............................ 191/10, 17, 18; 320/2, 21, 104; 336/196, 212, 220, 221, 222; 49/370

(56) References Cited

U.S. PATENT DOCUMENTS 6,509,822 B2 * 1/2003 Junjie et al. ................ 336/198

FOREIGN PATENT DOCUMENTS

| | | | |
|---|---|---|---|
| DE | 19545220 A1 * | 6/1997 | ............ B60L/1/00 |
| DE | 195 45 220 | 6/1997 | |
| DE | 19743313 C1 * | 12/1998 | ............ B60N/2/00 |
| DE | 197 43 313 | 12/1998 | |
| DE | 100 20 949 | 2/2001 | |
| EP | 96807 A2 * | 12/1983 | ........... H01F/19/00 |
| WO | WO 9410004 A1 * | 5/1994 | ........... B60L/11/18 |

* cited by examiner

*Primary Examiner*—Frantz F. Jules
(74) *Attorney, Agent, or Firm*—Kenyon & Kenyon

(57) ABSTRACT

A system is proposed for transmitting energy and/or data between a vehicle body and a removable part, a first core half having a pin and a pin ring which extend into a second core half to thus improve an inductive coupling. The first and second core halves are elements of an inductive transformer, and in each case have windings to transmit the energy and data, respectively. So that the pin does not protrude when a movable part is removed from a vehicle, in a further development, a ring is provided with bore holes and an annular spring which ensure that all primary-side transformer parts terminate flush with the vehicle floor. The improved inductive coupling makes it possible for the core halves to be made predominantly of an iron material.

5 Claims, 1 Drawing Sheet

SYSTEM FOR TRANSMITTING ENERGY AND/OR DATA BETWEEN A VEHICLE BODY AND A REMOVABLE PART

FIELD OF THE INVENTION

The present invention is based on a system for transmitting energy and/or data between a vehicle body and a removable part.

BACKGROUND INFORMATION

It is already known to use transformers for the wireless transmission of energy and data between the vehicle body and a removable part, e.g., a vehicle seat. To that end, inductive transformers are used in particular, windings at the primary side and at the secondary side being located in each case on an iron core. The core halves lie flat against each other. Due to the air gap, in order to avoid iron losses, an appropriate core material is used, for example, that is known under the trade name SOMALLOY, which is made of 95% iron powder and is bound into plastic polyamide.

SUMMARY OF THE INVENTION

In contrast, the system of the present invention for transmitting energy and/or data between a vehicle body and a removable part has the advantage that one of the core halves is constructed such that it has at least one pin which extends into the second core half. The magnetic flux is thereby increased. Moreover, the air gap is reduced. This also leads to an improvement in the magnetic flux.

It is particularly advantageous that the core half having the at least one pin has a ring with a spring, the ring being pressed by the spring against the second core half in the installed state. In the separated state, the spring releases such that it terminates flush with the outwardly facing surfaces of the at least one pin, so that the at least one pin does not protrude.

It is also advantageous that, in each case, at least one winding on the primary side and the secondary side is used for the energy and data transmission.

It is further advantageous that the ring and the spring are made predominantly of plastic, and the core halves are made predominantly of an iron material, since the iron losses, due to the design of the pin, allow the use of this iron material, and thus a denser magnetic field can be formed between the core halves. The transmission losses thereby become lower, and the possibility also exists of using a mechanically sturdier core material.

DETAILED DESCRIPTION

Due to the increasing spread of vehicles in which the seats are intended to be easily removable, for example, the popular sport utility vehicles (SUV's) and transporters, the electrical connection of electrical and electronic devices, built into a seat, are designed for a frequent assembly and disassembly. A mechanically reliable design approach is employed by the use of inductive transformers. According to the present invention, one core half of the inductive transformer now has a pin which extends into the other core half. The magnetic flux is thereby improved. In addition, this makes it possible to use an iron material having a higher permeability. Furthermore, this core material can be realized in a more cost-effective and mechanically more robust fashion.

Understood by pin and pin ring here is an equivalent term, since the use of a pin ring for separating the coils for the energy and data transmission is performed when working with the rotationally symmetrical transformers represented here.

Figure 1:
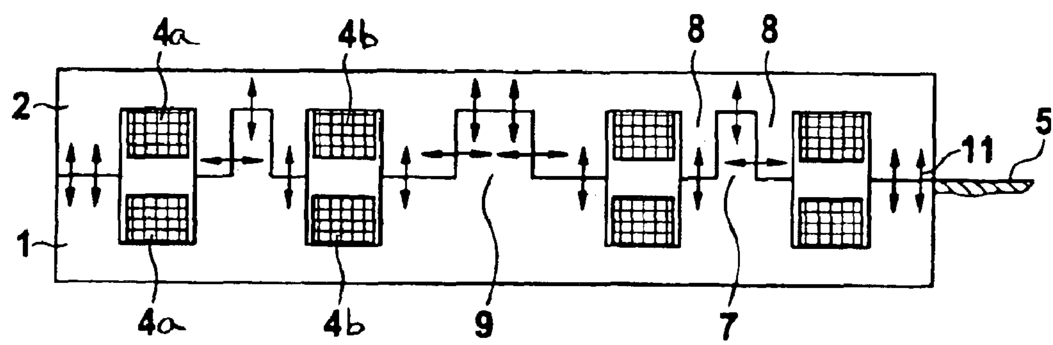
FIG. 1 shows a schematic representation of cross section of an inductive transformer with pin and shoulder, as well as a pin core with shoulder.

FIG. 1 shows a first schematic representation of a cross section of an inductive transformer with pin. A primary-side core half 1, located on the vehicle-body side, has a pin with shoulder 9 and a pin ring with shoulder 7, which in each case extend into a secondary-side core half 2 located in a removable part of the vehicle. A limb-type ring of the secondary-side core half surrounds the pin with shoulder 7. A marking for vehicle floor 5 indicates that pin with shoulder 7 and pin ring 9 jut out beyond this vehicle floor 5. Both primary-side core half 1 and secondary-side core half 2 have winding pairs 4*a,* 4*b*. The winding pair 4*b* are the windings for the energy transmission, designated in the following as power winding, and the winding pair 4*a* represent the windings for the data transmission, designated in the following by data winding.

In this context, the power winding is magnetically separated from the data winding by pin ring with shoulder 9. The magnetic flux lines are shown by arrows.

The magnetic flux, that is to say, the transmission and inductive coupling, is now improved by pin with shoulder 7 and pin ring with shoulder 9. The magnetic flux is shown by the double arrows having reference numeral 11.

The pot-type core shown in FIG. 1 here is rotationally symmetrical. Alternatively, it is possible to provide the transformer with a rectangular or quadratic form, as well.

Figure 2:
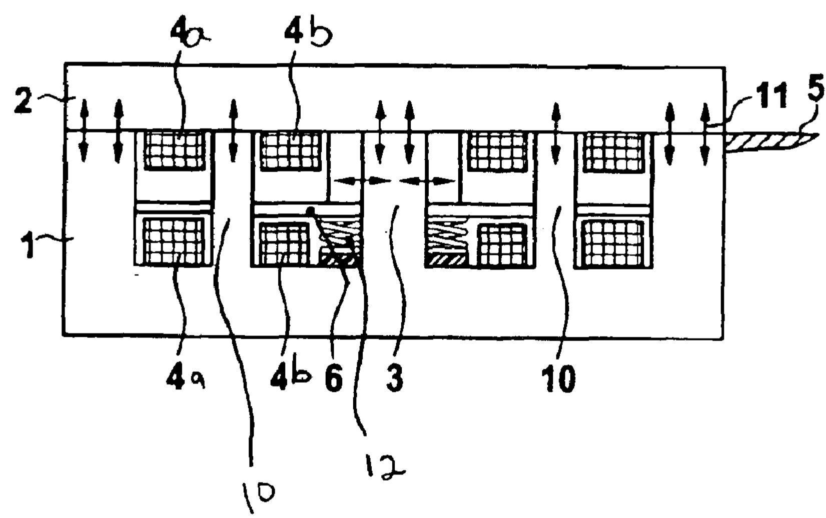
FIG. 2 shows a second schematic representation of a cross section of a transformer with pin, the primary side having a ring with spring.

FIG. 2 shows a second schematic representation of a cross section of an inductive transformer in a vehicle. Primary-side core half 1 again has a pin 3 which is surrounded by a limb-type ring of secondary-side core half 2. A ring 10 having merlon separates the winding pairs magnetically from one another, as in FIG. 1, and brings about a good magnetic flux from core half 1 to core half 2. Here, vehicle floor 5 is now implemented terminating flush with the outward-going front half of pin 3 and the faces of ring 10. In addition, however, here a plastic ring 6 is mounted on a plastic annular spring 12 on the primary side. In the installed state, plastic annular springs 12 press the plastic ring 6 against secondary-side core half 2, and specifically against the limb-type ring which surrounds pin 3. However, in the separated state, i.e. when the movable part, for example, the vehicle seat, is taken out, the plastic annular spring 12 will so relax that plastic ring 6 terminates flush with the outward-going end face of pin 3. Plastic ring 6 is provided with bore holes through which the merlons of ring 10 protrude. Consequently, a flat vehicle floor 5 then exists. The magnetic flux is again indicated with reference numeral 11.

It is furthermore possible to provide more or fewer windings on the primary and secondary side. Here, the material of the core is iron having a relative permeability of over 2000.

However, if a transformer installation is also possible laterally on the tunnel, a 1 cm long and approximately 1 cm thick pin and a circumferential pin ring approximately 0.5 cm thick could possibly also show from the tunnel side wall, since no loads are distributed thereon. A more cost-effective pin transformer construction would thereby become possible.

What is claimed is:

1. A system for transmitting at least one of energy and data between a vehicle body and a removable part, comprising:

a first core half including at least one pin;

a second core half into which the at least one pin extends;

an inductive transformer including:

at least one first winding arranged on the first core half and on a vehicle-body side as a primary side, and at least one second winding arranged on the second core half and on the removable part as a secondary side; and a ring including a spring and arranged on the first core half, wherein:

the spring presses the ring against the second core half in an installed state, and in a separated state, the spring relaxes in such a way that the ring terminates flush with a surface of the at least one pin facing outwardly.

2. The system according to claim 1, wherein:

in each case, at least one of the at least one first winding and the at least second winding for the data and energy transmission is provided both on the primary side and on the secondary side.

3. The system according to claim 1, wherein:

the ring and the spring are made predominantly of plastic.

4. The system according to claim 1, wherein:

the ring includes at least one bore bole for the at least one pin.

5. The system according to claim 1, wherein:

the first core half and the second core half are made predominantly of an iron material.

* * * * *